3,316,248
SYNTHETIC PENICILLINS
Lee C. Cheney, Fayetteville, N.Y., assignor, by mesne assignments, to Beecham Research Laboratories Ltd., Brentford, Middlesex, England, a corporation of Great Britain and Northern Ireland
No Drawing. Filed May 25, 1959, Ser. No. 815,287
9 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to substituted 6-(2-phenoxypropionamido)penicillanic acids and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against bezylpenicillin-resistant strains of bacteria or inhibit benzylpenicillinase and thus potentiate the action of benzylpenicillin when admixed therewith.

There is provided, according to the present invention, a member selected from the group consisting of an acid having the formula

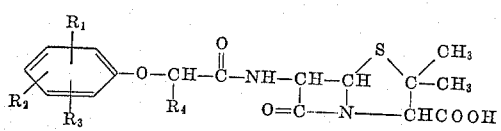

wherein $R_1$, $R_2$ and $R_3$ are each members selected from the group consisting of hydrogen, nitro, amino, (lower)-alkylamino, di(lower)-alkylamino, acylamino (where the acylating acid is an aliphatic carboxylic acid containing from one to ten carbon atoms inclusive and the substituent may thus also be named (lower)alkanoylamino), (lower)alkyl, chloro, bromo, iodo, (lower)alkoxy, hydroxy, sulfamyl, benzyl and trifluoromethyl and $R_4$ represents a member selected from the group consisting of lower alkyl (including, both here and above, straight and branched chain saturated aliphatic groups containing from one to ten carbon atoms inclusive), phenyl and phenylalkyl (including benzyl and α-, β-phenethyl and α-, β- and γ-phenylpropyl) and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula

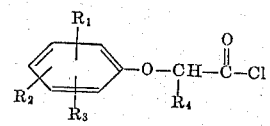

wherein $R_1$, $R_2$, $R_3$ and $R_4$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the anti-biotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is of course advisable when more than one phase is present, e.g., solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

When an acid chloride, an acid bromide or an acid anhydride is used in a process of the present invention, it is prepared from the corresponding acid according to the techniques set forth in the literature for acids such as phenylacetic acid and phenoxyacetic acid. In any instances where the substituted α-phenoxyalkanoic acid has not been described, it is prepared from the appropriately substituted phenol and the appropriate α-chloro- or α-bromo-acid by the methods described in the art for phenoxyacetic acid or substituted phenoxyacetic acids or described or referred to in U.S. Patents 2,854,450 and 2,479,297.

6-aminopenicillanic acid is prepared according to Batchelor et al. (Nature 183, 257, 258, Jan. 24, 1959) or Belgian Patent 569,728. It is used in the above reaction as the salt of a metal or a tertiary hydrocarbonyl amine or as an ester of a hydrocarbonyl alcohol.

Hydrocarbonyl alcohols and tertiary hydrocarbonyl amines are compounds having the formulae

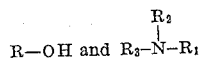

wherein the R groups contain only the elements carbon and hydrogen.

The following examples will serve to illustrate this invention without limiting it thereto.

Example 1

Triethylamine (1.5 ml.) was added to a cold solution (10° C.) of α-phenoxypropionic acid (1.66 gm., 0.01 mole) in 15 ml. pure dioxane. The resulting clear solution was stirred and cooled to 5–10° C. while isobutyl chloroformate (1.36 gm., 0.01 mole) in 5 ml. dioxane was added dropwise. When the addition had been completed the mixture was stirred at 5–8° C. during ten minutes and then a solution of 6-aminopenicillanic acid (2.16 gm., 0.01 mole) in 15 ml. water and 2 ml. triethylamine was added dropwise while the temperature was maintained below 10° C. The resulting mixture was stirred in the cold during 15 minutes and then at room temperature for 30 minutes, diluted with 30 ml. cold water and extracted with ether which was discarded. The cold aqueous solution was then covered with 75 ml. ether and acidified to pH 2 with 5 M $H_2SO_4$. After shaking, the ether layer containing the product, 6-(2-phenoxypropionamido)penicillanic acid, was dried for ten minutes over anhydrous $Na_2SO_4$ and filtered. Addition of 6 ml. of dry n-butanol containing 0.373 gm./ml. potassium 2-ethylhexanoate precipitated the potassium salt of the product as a colorless oil which crystallized on stirring and scratching and was collected, dried in vacuo and found to weigh 2.75 gm., to melt at 217–219° C., to be very soluble in water, to contain the β-lactam structure as shown by infrared analysis and to inhibit *Staph. aureus* Smith at a concentration of 0.07 mcg./ml.

Example 2

α-(2,4-dichlorophenoxy)propionic acid (0.01 mole), triethylamine (0.011 mole) and isobutyl chloroformate (0.01 mole) are stirred in 20 ml. pure, dry dioxane and 2 ml. dry acetone for about thirty minutes at about 4° C. To this solution there is then added a chilled solution of 6-aminopenicillanic acid (0.01 mole) and triethylamine (0.01 mole) in 20 ml. water and the mixture is stirred about an hour in the cold. After the addition of 1.0 gm. $NaHCO_3$ in 30 ml. cold water, the solution is extracted twice with 75 ml. portions of ether and the ethereal extract is discarded. The aqueous solution is cooled and stirred in an ice-bath, covered with 75 ml. ether and adjusted to pH 2 with 5 N $H_2SO_4$. The ether is separated and the aqueous solution is again extracted with 75 ml. ether. The combined ethereal extracts containing the product, 6-[α-(2,4-dichlorophenoxy)propionamido]-penicillanic acid, are dried rapidly over anhydrous $Na_2SO_4$ and filtered. The addition of 6 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

*Example 3*

α-(2,4-diisoamylphenoxy)-n-butyric acid (0.02 mole), triethylamine (0.021 mole) and isobutyl chloroformate (0.02 mole) are stirred in 40 ml. pure, dry dioxane and 4 ml. dry acetone for about thirty minutes at about 4° C. To this solution there is then added a chilled solution of 6-aminopenicillanic acid (0.02 mole) and triethylamine (0.02 mole) in 40 ml. water and the mixture is stirred about an hour in the cold. After the addition of 2.0 gm. $NaHCO_3$ in 60 ml. cold water, the solution is extracted twice with 150 ml. portions of ether and the ethereal extract is discarded. The aqueous solution is cooled and stirred in an ice-bath, covered with 150 ml. ether and adjusted to pH 2 with 5 N $H_2SO_4$. The ether is separated and the aqueous solution is again extracted with 150 ml. ether. The combined ethereal extracts containing the product, 6-[α-(2,4-diisoamylphenoxy)-n-butyramido]-penicillanic acid, are dried rapidly over anhydrous $Na_2SO_4$ and filtered. The addition of 12 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

*Example 4*

α-(2,4-dichlorophenoxy)-n-butyric acid (0.04 mole), triethylamine (0.044 mole) and isobutyl chloroformate (0.04 mole) are stirred in 80 ml. pure, dry dioxane and 8 ml. dry acetone for about thirty minutes at about 4° C. To this solution there is then added a chilled solution of 6-aminopenicillanic acid (0.04 mole) and triethylamine (0.04 mole) in 80 ml. water and the mixture is stirred about an hour in the cold. After the addition of 4.0 gm. $NaHCO_3$ in 120 ml. cold water, the solution is extracted twice with 300 ml. portions of ether and the ethereal extract is discarded. The aqueous solution is cooled and stirred in an ice-bath, covered with 300 ml. ether and adjusted to pH 2 with 5 N $H_2SO_4$. The ether is separated and the aqueous solution is again extracted with 300 ml. ether. The combined ethereal extracts containing the product, 6-[α-(2,4-dichlorophenoxy) - n - butyramido]-penicillanic acid, are dried rapidly over anhydrous $Na_2SO_4$ and filtered. The addition of 24 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

*Example 5*

α-(4-trifluoromethylphenoxy) - n - butyric acid (0.01 mole), triethylamine (0.011 mole) and isobutyl chloroformate (0.01 mole) are stirred in 20 ml. pure, dry dioxane and 2 ml. dry acetone for about thirty minutes at about 4° C. To this solution there is then added a chilled solution of 6-aminopenicillanic acid (0.01 mole) and triethylamine (0.01 mole) in 20 ml. water and the mixture is stirred about an hour in the cold. After the addition of 1.0 gm. $NaHCO_3$ in 30 ml. cold water, the solution is extracted twice with 75 ml. portions of ether and the ethereal extract is discarded. The aqueous solution is cooled and stirred in an ice-bath, covered with 75 ml. ether and adjusted to pH 2 with 5 N $H_2SO_4$. The ether is separated and the aqueous solution is again extracted with 75 ml. ether. The combined ethereal extracts containing the product 6-[α-(4-trifluoromethylphenoxy)-n-butyramido]-penicillanic acid, are dried rapidly over anhydrous $Na_2SO_4$ and filtered. The addition of 6 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

*Example 6*

α-(4-benzylphenoxy)propionic acid (0.02 mole), triethylamine (0.022 mole) and isobutyl chloroformate (0.02 mole), are stirred in 40 ml. pure, dry dioxane and 4 ml. dry acetone for about thirty minutes at about 4° C. To this solution there is then added a chilled solution of 6-aminopenicillanic acid (0.02 mole) and triethylamine (0.02 mole) in 40 ml. water and the mixture is stirred about an hour in the cold. After the addition of 2.0 gm. $NaHCO_3$ in 60 ml. cold water, the solution is extracted twice with 150 ml. portions of ether and the ethereal extract is discarded. The aqueous solution is cooled and stirred in an ice-bath, covered with 150 ml. ether and adjusted to pH 2 with 5 N $H_2SO_4$. The ether is separated and the aqueous solution is again extracted with 150 ml. ether. The combined ethereal extracts containing the product, 6-[α-(4-benzylphenoxy)propionamido]-penicillanic acid, are dried rapidly over anhydrous $Na_2SO_4$ and filtered. The addition of 12 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

*Example 7*

In the procedure of Example 1, the α-phenoxypropionic acid is replaced by 0.10 mole α-(2-chlorophenoxy)propionic acid,
α-(p-sulfamylphenoxy)-n-butyric acid,
α-(3,4-dimethoxyphenoxy)-n-pentanoic acid,
α-(3-methylphenoxy)-iso-valeric acid,
α-(4-dimethylaminophenoxy)-n-hexanoic acid,
α-(2-methoxyphenoxy)-n-decanoic acid,
α-(2,4-dichlorophenoxy)-phenylacetic acid,
α-(2-nitrophenoxy)-β-phenylpropionic acid,
α-(2-acetamidophenoxy)-γ-phenylbutyric acid,
α-(2,4-dimethylphenoxy)-n-butyric acid,
α-(4-isopropylphenoxy)propionic acid,
α-(3-bromophenoxy)-n-butyric acid,
α-(2-iodophenoxy)-phenylacetic acid,
α-(2-ethylaminophenoxy)-iso-valeric acid,
α-(2,5-dihydroxyphenoxy)-isohexanoic acid,
α-(4-hydroxyphenoxy)propionic acid,
α-phenoxy-iso-valeric acid,
α-phenoxy-n-decanoic acid,
α-phenoxy-γ-phenylbutyric acid,
α-(2-benzylphenoxy)-n-butyric acid,
α-(2-trifluoromethylphenoxy)propionic acid, and
α-(4-aminophenoxy)propionic acid, respectively,
to produce the acids
6-[α-(2-chlorophenoxy)propionamide]penicillanic acid,
6-[α-(4-sulfamylphenoxy)-n-butyramido]penicillanic acid,
6-[α-(3,4-dimethoxyphenoxy)-n-pentanoamido] penicillanic acid,
6-[α-(3-methylphenoxy)-iso-valeramido]penicillanic acid,
6-[α-(4-dimethylaminophenoxy)-n-hexanoamido] penicillanic acid,
6-[α-(2-methoxyphenoxy)-n-decanoamido]penicillanic acid,
6-[α-(2,4-dichlorophenoxy)phenylacetamido] penicillanic acid, 6-[α-(2-nitrophenoxy)-β-phenylpropionamido]
penicillanic acid,
6-[α-(2-acetamidophenoxy)-γ-phenylbutyramido]
penicillanic acid,
6-[α-(2,4-dimethylphenoxy)-n-butyramido]penicillanic
acid,
6-[α-(4-isopropylphenoxy)propionamido]penicillanic
acid,
6-[α-(3-bromophenoxy)-n-butyramido]penicillanic acid,
6-[α-(2-iodophenoxy)phenylacetamido]penicillanic acid,
6-[α-(2-ethylaminophenoxy)-iso-valeramido]
penicillanic acid,
6-[α-(2,5-dihydroxyphenoxy)-iso-hexanoamido
penicillanic acid,
6-[α-(4-hydroxyphenoxy)propionamido]penicillanic
acid,
6-[α-phenoxy-iso-valeramido]penicillanic acid,
6-[α-phenoxy-n-decanoamido]penicillanic acid,
6-[α-phenoxy-γ-phenylbutyramido]penicillanic acid,
6-[α-(2-benzylphenoxy)-n-butyramido]penicillanic acid,
6-[α-(2-trifluoromethylphenoxy)propionamido]
penicillanic acid, and
6-[α-(4-aminophenoxy)propionamido]penicillanic acid,
respectively, which are isolated as their solid, water-soluble potassium salts and found to inhibit *Staph. aureus* Smith at concentrations of 0.001 percent by weight.

*Example 8*

To a cooled, stirred solution of α-phenoxyphenylacetic acid (6.8 g., 0.03 mole) in 40 ml. pure dry dioxane there was added dropwise 4.2 ml. (3.0 g., 0.03 mole) triethylamine and then over five to ten minutes at 12–13° C. isobutyl chloroformate (4.1 ml., 4.1 g., 0.03 mole). After stirring 15 minutes and lowering the temperature to about 8° C. there was added over ten minutes a solution of 6-aminopenicillanic acid (6.2 g., 0.03 mole) and triethylamine (4.2 ml.) in 25 ml. water. The reaction mixture was stirred at about 0° C. for 15 minutes and then for 20 minutes with the ice bath removed. After adding 40 ml. ice water, the reaction mixture was twice extracted with ether which was discarded. The aqueous phase was covered with ether, adjusted to pH 2 with 5 M $H_2SO_4$ and twice extracted into 100 ml. ether. The combined ethereal extracts containing the product, 6-(α-phenoxyphenylacetamido)penicillanic acid, were washed once with cold water, dried quickly over anhydrous sodium sulfate and filtered. The addition of 15 ml. of dry n-butanol containing 0.373 g./ml. potassium 2-ethylhexanoate precipitated the potassium salt of the product as a gum which was dissolved in methyl isobutyl ketone. Addition of about twenty volumes of dry ether precipitated this salt as an amorphous white solid which was collected, dried in vacuo over $P_2O_5$ and found to weight 11.0 g., M.P. 88–95° C., decomposed at 120–125° C., to contain the β-lactam ring as shown by infrared analysis and to inhibit *Staph. aureus* Smith at a concentration of 0.2 mcg./ml.

*Example 9*

α-(p-tert.-butylphenoxy)propionic acid (0.03 mole, 6.68 g.), triethylamine (4.22 ml., 0.03 mole) and isobutyl chloroformate (3.9 ml., 0.03 mole) were dissolved at 0–3° C. in 40 ml. pure, dry dioxane and 5 ml. acetone and the solution was stirred twenty minutes. There was then added a solution chilled to 0.3° C. of 6-aminopenicillanic acid (6.5 g., 0.03 mole) and triethylamine (4.22 ml., 0.03 mole) in 40 ml. water and the reaction mixture was stirred for one hour. The mixture was adjusted to pH 8 with 10% aqueous $NaHCO_3$ and extracted with ether, which was discarded. The aqueous phase was covered with ether, acidified with 6 N HCl to pH 2 and twice extracted with ether. The combined ethereal extracts containing the product, 6-[α-(p-tert.-butylphenoxy)propionamido]penicillanic acid, were washed with cold water, dried over anhydrous $Na_2SO_4$ and filtered. The addition of 5 ml. (15 ml. would have been preferable) of 40% potassium 2-ethylhexanoate converted the product to its potassium salt which was precipitated as a white, crystalline solid upon dilution with anhydrous ether, collected by filtration, dried overnight in vacuo over $P_2O_5$ and found to weigh 6.2 g., to melt at 219–220° C. with decomposition, to contain the β-lactam ring as shown by infrared analysis and to inhibit *Staph. aureus* Smith at a concentration of 0.1 mcg./ml.

*Example 10*

The procedure of Example 9 was followed except that the α-(p-tert.-butylphenoxy)propionic acid was replaced by 2-(p-tert.-amylphenoxy)-n-butyric acid (7.53 g., 0.03 m., also called α[para(1,1-dimethylpropyl)phenoxy]-n-butyric acid) to produce the final product, potassium 6-[α-(p-tert.-amylphenoxy)-n-butyramido]penicillanate as a solid gum (after trituration with ether) which was converted to a fine powder on drying in a vacuum dessicator over $P_2O_5$. This salt weighted 4.7 g., on heating slowly decomposed above 125° C., contained the β-lactam ring as shown by infrared analysis and was found to inhibit *Staph. aureus* Smith at a concentration of less than 10 mcg./ml.

I claim:
1. A member selected from the group consisting of an acid having the formula

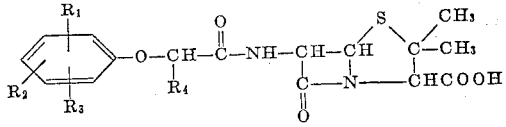

wherein $R_1$, $R_2$ and $R_3$ are each members selected from the group consisting of hydrogen, nitro, amino, (lower)-alkylamino, di(lower)alkylamino, (lower)alkanoylamino, (lower)alkyl, chloro, bromo, iodo, (lower)alkoxy, hydroxy, sulfamyl, benzyl and trifluoromethyl and $R_4$ represents a member selected from the group consisting of (lower)alkyl, phenyl and phenyl(lower)alkyl; and its sodium, potassium, calcium, aluminum and ammonium salts and its nontoxic substituted ammonium salts with an amines, procaine, dibenzylamine, N-benzyl-beta-phenethylamine, 1-ephenamine, N,N'-dibenzylethylenediamine, dehydroabiethylamine and N,N'-bis-dehydroabietylethylenediamine, 2. 6-(2-phenoxypropionamido)penicillanic acid.
3. 6-[α-(2,4-dichlorophenoxy)propionamido]penicillanic acid.
4. 6-[α-(2,4-diisoamylphenoxy)-n-butyramido]-penicillanic acid.
5. 6-[α-(4-trifluoromethylphenoxy)-n-butyramido]-penicillanic acid.
6. 6-[α-phenoxy-γ-phenylbutyramido]penicillanic acid.
7. A member selected from the group consisting of an acid having the formula

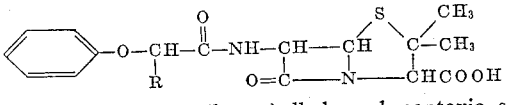

wherein R represents (lower)alkyl; and nontoxic salts thereof.

8. A member selected from the group consisting of an acid having the formula

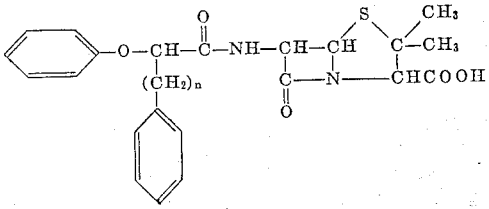

wherein *n* represents an integer from 0 to 3 inclusive; and nontoxic salts thereof.

9. A member selected from the group consisting of an acid of the formula

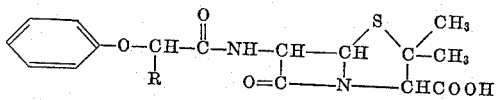

wherein R is lower alkyl, and its sodium salt and its potassium salt.

References Cited by the Examiner

UNITED STATES PATENTS

| | | | |
|---|---|---|---|
| 2,479,296 | 8/1949 | Behrens et al. | 260—239.1 |
| 2,756,226 | 7/1956 | Brandl et al. | 260—239.1 |
| 2,854,450 | 9/1958 | Cheney | 260—239.1 |

OTHER REFERENCES

The Chemistry of Penicillin, pp. 674–675 (1949), Princeton Univ. Press.

NICHOLAS S. RIZZO, *Primary Examiner.*

UNITED STATES PATENT OFFICE
CERTIFICATE OF CORRECTION

Patent No. 3,316,248                                        April 25, 1967

Lee C. Cheney

It is hereby certified that error appears in the above numbered patent requiring correction and that the said Letters Patent should read as corrected below.

Column 1, line 32, for "bezylpenicillin-resistant" read -- benzylpenicillin-resistant --; column 3, line 20, for "anti-biotic" read -- antibiotic --; column 6, line 64, for "6-[α-(2-chlorophenoxy)propionamide]penicillanic acid" read -- 6-[α-(2-chlorophenoxy)propionamido]penicillanic acid --; column 8, line 44, for "amines," read -- amine, --; same line 44, before "procaine" insert -- selected from the group consisting of trialkylamines, --.

Signed and sealed this 20th day of August 1968.

(SEAL)
Attest:

Edward M. Fletcher, Jr.                                    EDWARD J. BRENNER
Attesting Officer                                             Commissioner of Patents